US005485792A

United States Patent [19]

Keyser et al.

[11] Patent Number: 5,485,792

[45] Date of Patent: Jan. 23, 1996

[54] LATENT IMAGE DEVELOPMENT SYSTEM

[75] Inventors: Patrick J. Keyser, Milwaukee; W. James Bousman, Burlington; Robert W. Biemeck, Racine, all of Wis.

[73] Assignee: Western Publishing Co., Inc., Racine, Wis.

[21] Appl. No.: 499,680

[22] Filed: Jul. 7, 1995

[51] Int. Cl.$^6$ .................... C09D 11/02; C09D 13/00

[52] U.S. Cl. .................... 106/21 R; 106/21 A; 106/21 C; 106/19 B

[58] Field of Search .................... 106/21 R, 21 A, 106/21 C, 21 D, 19 B

[56] References Cited

U.S. PATENT DOCUMENTS

| | | | |
|---|---|---|---|
| 3,672,842 | 6/1972 | Florin | 106/19 B |
| 3,957,495 | 5/1976 | Teranishi et al. | 106/19 B |
| 3,979,550 | 9/1976 | Panken | 106/21 R |
| 4,098,738 | 7/1978 | Buerkley et al. | 106/21 R |
| 4,111,702 | 9/1978 | Fraik | 106/21 C |
| 4,322,466 | 3/1982 | Tomlinson | 106/21 R |
| 4,348,234 | 9/1982 | Cespon | 106/21 R |
| 4,525,214 | 6/1985 | Panken | 106/19 B |
| 4,631,203 | 12/1986 | Schaefer et al. | 106/21 R |
| 5,139,572 | 9/1992 | Kawashima | 106/21 R |
| 5,215,956 | 6/1993 | Kawashima | 106/21 R |

OTHER PUBLICATIONS

Petitpierre, J. C., "Dyes And Chemicals For Carbonless Copying Paper: History, Present Situation, Problems And Trends," 1983 Coating Conference, pp. 157–164.

*Primary Examiner*—Helene Klemanski
*Attorney, Agent, or Firm*—Amster, Rothstein & Ebenstein

[57] ABSTRACT

A latent image development system for producing a multicolor image on a substrate, includes in combination a substrate and dispenser. The substrate has a colorless or faintly colored latent multicolor image thereon, the latent image being formed by a plurality of different color former compositions, each including a Lewis base color former. The dispenser is adapted to development of the latent multicolor image on the substrate by marking thereover and reacting with a single color developer composition, the color developer composition being free of inorganic metallic salts and including a Lewis acid color developer operative for each of the color former compositions.

27 Claims, 1 Drawing Sheet

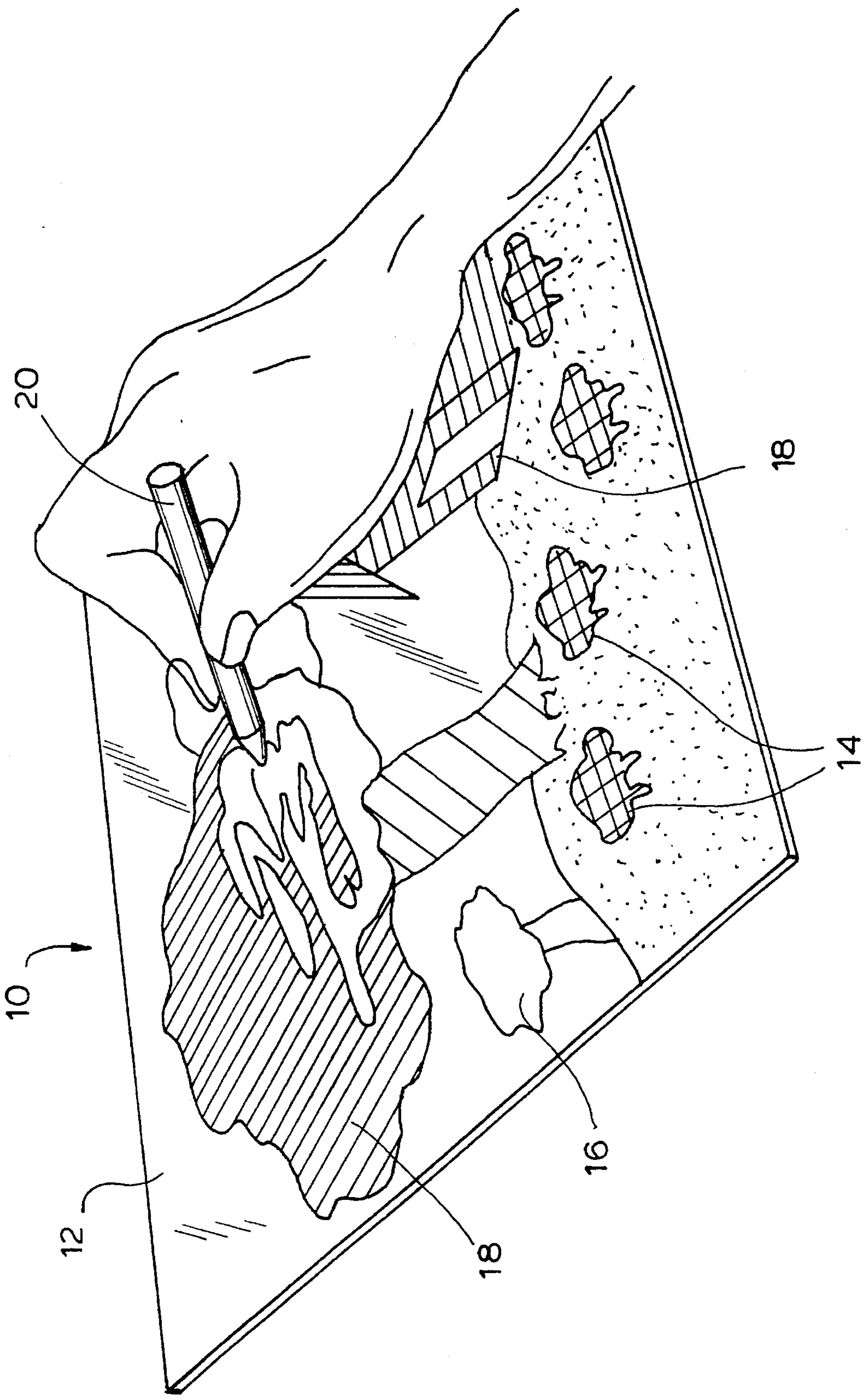
20
18
10
14
14
16
12
18

LATENT IMAGE DEVELOPMENT SYSTEM

BACKGROUND OF THE INVENTION

The present invention relates to a latent image developing system for producing an image on a substrate, and more particularly, to such a system for producing a multicolor image on a substrate.

One conventional embodiment of a latent image developing system for producing a color image on a substrate comprises a substrate and a dispenser. The substrate is typically paper and has a color developer composition (typically containing organic metallic salts) including a color developer disposed in a latent image on the substrate. The dispenser is adapted to the development of the color image on the substrate by marking thereover and reacting with the color developer composition in the latent image, the dispenser containing a color former composition including a color former. The dispenser is typically a crayon containing wax, the color former and a solvent therefor. This embodiment is well suited to games. The location where the dispenser is to be used may be indicated—e.g., in outline—so that the composition dispensed by the dispenser is not wasted, and the child playing with the game sees an immediate response to his use of the dispenser.

Alternatively, in a carbonless paper embodiment, both the color former and the color developer may be on the substrate, but with one of the color former and color developer contained separately in microcapsules. When pressure is exerted on the microcapsules, e.g., by writing, the microcapsules rupture, whereupon the essentially colorless color former composition comes into contact with the color developer and the desired color marking develops.

The games based on the conventional latent image development systems have not proven to be entirely satisfactory in use. While the limitation of the developed latent image to a single color is perfectly acceptable for carbonless paper, it severely limits the play value of a game as a child will more rapidly lose interest when he is able to predict that movement of the dispenser in a given area will result in a particular color being developed as a result of the color former of the dispenser coming into contact with the color developer of the substrate.

Further, despite the game designer's intention that the child shall apply the color former composition in the dispenser only to particular designated portions of the substrate, children will be children and typically the color former composition in the dispenser is applied willy-nilly over the substrate. Where the developer composition on the substrate has been applied in a particular latent image pattern, the use of the color former composition in the dispenser over the entire surface of the substrate will still only bring out the latent image defined by the presence of the developer composition, but it will waste a substantial amount of the color former composition in the dispenser, which color former composition is typically more expensive than the color developer composition.

Accordingly, it is an object of the present invention to provide a latent image development system for producing a multicolor image on a substrate.

Another object is to provide such a system wherein the color former composition defines the latent image on the substrate and the color developer composition is applied to the latent image on the substrate from a dispenser.

A further object is to provide such a system which is economical to use as the excess application of the composition from the dispenser results in excess application of the cheaper composition.

It is also an object of the present invention to provide such a system which provides greater play value to a game because of the multicolor nature of the developed image.

SUMMARY OF THE INVENTION

It has now been found that the above and related objects of the present invention are obtained in a latent image development system for producing a multicolor image on a substrate. The system comprises a combination of a substrate and a dispenser. The substrate has a colorless or faintly colored latent multicolor image thereon, the latent image being formed by a plurality of different color former compositions, each including a Lewis base color former. The dispenser is adapted to development of the latent multicolor image on the substrate by marking thereover and reacting with a single color developer composition, the color developer composition being free of inorganic metallic salts and including a Lewis acid color developer operative for each of the color former compositions.

In a preferred embodiment, the substrate is paper printed with the color former compositions. The substrate may be printed with both the color former compositions and a visible color image which will cooperate with the latent multicolor image later developed by the dispenser to form a visible multicolor image. The color former changes hybridization from $sp^3$ to $sp^2$ in going from a colorless non-planar geometry to a colored planar geometry. The color former is preferably selected from the group consisting of crystal violet lactone, Michler's hydrol, fluoran, leuco and auramine compounds, bis-indolylphthalide compounds and combinations thereof.

In another preferred embodiment, the dispenser is in solid form and contains a plurality of different types of wax compositions and a solvent for the color developer composition. Alternatively, the dispenser is a felt tip pen or liquid paint.

The color developer is preferably a zinc salt of a phenolic compound, a phenolic hydroxy group-containing compound or a zinc modified phenolic resin compound.

The present invention also encompasses a latent image development system for producing a multicolor image on a substrate, comprising a substrate having a colorless or faintly colored latent multicolor image thereon, the latent image being formed by a plurality of different color former compositions, each including a Lewis base color former. The latent image is adapted to development of the latent multicolor image on the substrate by marking thereover and reacting with a single color developer composition, the color developer composition being free of inorganic metallic salts and including a Lewis acid color developer operative for each of the color former compositions.

The present invention further encompasses a latent image development system for producing a multicolor image on a substrate having a colorless or faintly colored latent multicolor image thereon, the latent image being formed by a plurality of different color former compositions, each including a Lewis base color former. The system comprises a dispenser adapted to development of a latent multicolor image on a substrate by marking thereover and reacting with a single color developer composition. The color developer composition is free of inorganic metallic salts and includes a Lewis acid color developer operative for each color former composition.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

The FIGURE is an isometric view of the dispenser applying a single color developer to a substrate having a colorless or faintly colored latent multicolor image thereon (formed by a plurality of different color former compositions) as well as a preexisting colored image, the images being shaded for contrasting color.

DETAILED DESCRIPTION OF THE PREFERRED EMBODIMENTS

In accordance with the present invention, a novel image development system has been discovered in which a latent image containing a color former is developed by reactive contact with a color developer. The latent image development system of the invention comprises a substrate, preferably paper stock, having a latent image printed thereon from the color former of the invention, and a dispenser instrument for dispensing the color developer onto the latent image. The dispenser instrument may be a special colorless wax crayon, a felt tip marker or a liquid "paint". The crayon, marker or liquid paint contains a special active material called a color developer that reacts with special colorless dyes or color formers in the ink. Each ink "color" has a single color former or group of color formers in it. Several ink "colors" are printed at once on the page. When developed with the crayon or pen, a multicolored image appears from the seemingly blank page.

Multiple colors can be developed simultaneously on the same page. These latent multiple colors can be printed in one press pass as white inks on white paper by the same process as printing normal four-color work. Hence the printed page appears invisible until developed by the special crayon, pen activator or liquid paint. In addition to the discrete invisible printed colors, other combinations of invisible colors can be created, just as in normal color work. For example, the latent red ink printed over latent yellow will create a latent orange color; red over blue will create violet, etc. As a result, virtually unlimited multiple colors can be attained through the typical four color process. This is done, e.g., by blending varying intensities of the three primary colors-red, blue and yellow--to achieve a spectrum of possible colors.

I. COLOR FORMERS AND COLOR DEVELOPERS

Summary

The color former is a colorless dye that turns a certain color when contacted by the color developer. Either the color former or the color developer or both must be in solution to enable intimate contact between the two. In the present application, the color developer is dissolved in dibutyl phthalate or a like solvent and then dispersed in a solid material-namely, the wax. The color former is dissolved in a suitable solvent and mixed with a white ink to make an ostensibly invisible (or faintly colored) image on the paper.

The color formers are generally electron-donating or Lewis base chromatic organic compounds. They are normally colorless or faintly colored. The color developers are generally weakly acidic compounds, or electron accepting compounds known as Lewis acids, which react with the color formers to form colored species.

Color Formers

In this invention, many different color forming dyes can be used which develop into a variety of colors including black, blue, red, yellow, orange and green. The color formers suitable for use in the color former composition are known colorless or faintly colored substances which, on coming into contact with the appropriate color developers, become strongly colored or change color.

Generally the color former is an electron donating compound or Lewis base whose central carbon atom undergoes a change in hybridization from $sp^3$ to sp upon reaction with a Lewis acid. Along with this change in hybridization is a corresponding change in geometry from essentially non-planar to planar. The geometry of the molecule also changes from a colorless non-planar structure to a colored flat structure.

These types of color formers are well described in the patent literature and are available commercially under the Pergascript trade name (from Ciba-Geigy Corporation in Greensboro, N.C.) and under the Copikem trade name (from Hilton Davis Company in Cincinnati, Ohio). Typical preferred color formers include Crystal Violet Lactone, Michler's hydrol, fluoran compounds, leuco compounds, auramine compounds, bis-indolylphthalide compounds, and combinations thereof. Many are proprietary and the exact chemical compositions thereof unknown.

Suitable color formers and their chemical types are identified in Table 1.

TABLE 1

| Color Formers | | |
|---|---|---|
| Trade Name | Color | Chemical Type |
| Pergascript | Orange I-5R | substituted monoamino fluoran |
| " | Black I-2R | diamino fluoran |
| " | Green I-2G | xanthene dye |
| " | Blue I-2G | xanthene dye |
| " | Red I-6B | bis-indolyl phthalide |
| " | Blue S-RB | Carbazolyl Blue |
| " | Blue I-2R | Crystal Violet Lactone |
| " | Yellow I-3R | proprietary - quinazoline dye |
| Copikem | 1 Blue CVL | Crystal Violet Lactone |
| " | 4 Black N-102 | diamino fluoran |
| " | 5 Green | diamino fluoran |
| " | 20 Magenta | bis indolyl phthalide |
| " | 37 Yellow | proprietary - dialkyl amino phenyl derivative |

Color Developers

The color developers are weakly acidic organic or inorganic compounds. While weak solutions of mineral acids can cause color changes, the best inorganic color developer is acid activated bentonite clay. One source for this is American Colloid Company, Arlington Heights, Ill., which sells clay for carbonless paper applications under the Camargo trade name. Since our developer must be soluble in some medium, this developer is unsuitable for our application.

The best organic color developers are compounds with phenolic functional groups such as alkylated phenols, phenolic resins and other similar compounds. Of these, the best are zinc chelated or zinc modified phenolic salts and resins such as zinc salicylate and zinc phenolic resin. These phenolic compounds are weakly acidic and can effect deeper color changes than inorganic compounds. The addition of the zinc metal ion creates an even more intense color change, as is typical of transition metal salts.

Suitable color developers and their chemical types are identified in Table 2.

TABLE 2

| Color Developers | |
|---|---|
| Compound | Chemical Type |
| zinc chloride | inorganic zinc salt |
| salicylic acid | phenolic acid |
| nonyl phenol | alkylated phenol |
| zinc salicylate | zinc phenolic acid salt |
| phenolic resin | zinc oligomer or polymer |
| zinc phenolic resin | zinc salt of above |

Preferably, a wax crayon serves as the dispenser from which the color developer is dispensed. However, other instruments, such as, for example, a felt pen or liquid "paint" containing a solution of the color developer, can also be utilized.

II. THE DISPENSER CRAYON

As noted, the dispensing instrument for applying the color developer over the latent image is preferably a wax crayon. In addition to the wax and developer, the crayon contains a solvent for the developer which facilitates its blending with the wax in the production of the crayon. Preferably, the developer is initially dissolved in the solvent, and this solution then compounded with the wax.

A variety of waxes can be used in the crayon of the invention. Preferably, the crayon is a mixture of paraffin, microcrystalline and polyethylene waxes, but other waxes, such as candelilla wax, carnauba wax, beeswax or others may be substituted for one or more of the preferred waxes.

Preferably, the crayon comprises about 10%–30% developer, about 10%–30% solvent for the developer, and about 50%–80% by weight wax. It is particularly preferred that the crayon be about 15%–35% of paraffin wax, about 15%–35% polyethylene wax, and about 5%–15% by weight microcrystalline wax.

In the preparation of the crayon of the invention, the developer, preferably either zinc salicylate or zinc phenolic resin, is initially dissolved in the solvent therefor at a temperature in the range of 200°–240° F., preferably 215°–225° F. The waxes are then melted separately, and the hot oil solution of the developer is then added to the melted wax mixture. During wax addition, the temperature of the oil solution is maintained in the aforesaid range and the contents of the mixing vessel agitated to achieve thorough intermixture of the formulation ingredients. Waxes can be added in either solid or pre-melted form, but are preferably pre-melted. Once a substantially homogeneous mixture is obtained, the composition is cast into crayon molds and allowed to cool, typically overnight, to form the crayon of the invention.

Table 3 sets forth various formulations for the developer crayon wax. The narrow range formulation represents the best overall formula to date. The qualities that determine the best crayon include many factors such as developing speed, final color quality, smoothness of writing, odor, texture and feel of the crayon, lightfastness and colorfastness. The medium range formulations yield a sample of reasonably good quality and writing ability. The broad range formulations yield a working crayon, though it may have certain inferior qualities such as lack of homogeneity and poorer color developing ability.

TABLE 3

| Crayon Wax Formulations | | | |
|---|---|---|---|
| Broad | Medium | Narrow | Component |
| 0–90 | 0–62 | 23.8 | paraffin wax |
| 0–90 | 0–62 | 23.8 | polyethylene wax |
| 0–30 | 5–24 | 14.3 | microcrystalline wax |
| 5–60 | 10–30 | 19.0 | dibutyl phthalate |
| 5–45 | 10–30 | 19.0 | zinc phenolic resin |

For both the broad and medium ranges, the amount of paraffin wax should vary inversely with the amount of polyethylene wax used. The amount of microcrystalline wax used can vary independently of the other waxes. For best results the zinc phenolic resin should be used in a 1:1 ratio with the dibutyl phthalate.

| Preferred Components | |
|---|---|
| Paraffin Wax | 4669 Paraffin Wax from Dussek Campbell, Inc., National Wax Division, Skokie, IL |
| Polyethylene Wax | PH-100 Wax from Dussek Campbell, Inc., National Wax Division, Skokie, IL |
| Microcrystalline Wax | Petrowax 5530 Amber Microcrystalline from Hase Petroleum Wax Co., Arlington Heights, IL |
| Dibutyl Phthalate | any local commercial supplier or distributor |
| Zinc Phenolic Resin | HRJ-13023 Resin from Schenectady International, Schenectady, NY |

Function of the Components and Possible Substitutions Paraffin Wax

The paraffin wax gives the wax its characteristic feel and writing ability. This wax can easily transfer to the paper writing surface and is a major component of ordinary crayons.

The Dussek Campbell 4669 Wax is preferred. Other paraffin waxes may be used (preferably having a melting point around 140°–150° F.). Some paraffin waxes result in crayons that are too crystalline or are not fully miscible with the other components, especially the activator (developer) solvent.

Polyethylene Wax

This wax imparts hardness to the crayon. Without this wax, the crayon is much softer and has a very sticky and greasy feel due to the dibutyl phthalate. Addition of polyethylene wax also makes the crayon glide easier over the writing surface. The resulting wax has very little greasy feel, writes smoother, and flakes off less when writing. After writing on a porous paper surface, the dibutyl phthalate from crayons made without this wax tends to soak into the paper, discoloring both sides of the page. This problem is eliminated when the polyethylene wax is added.

The PH-100 Wax is preferred. Since this wax may be a proprietary blend of waxes, substitutions may result in varying effects. Substitution may be made provided the desired qualities are still met.

Microcrystalline Wax

This wax, when combined with the paraffin wax, prevents brittleness of the crayon and promotes easier miscibility of the dibutyl phthalate with the other waxes. Without this wax, the dibutyl phthalate may sweat out of the wax or not combine well with the wax. Using only paraffin wax may also result in a too brittle and crystalline crayon. Microcrystalline wax, having a less well defined crystal structure than paraffin wax, makes the crayon less crystalline and more amorphous. This makes the crayon less likely to be broken. The microcrystalline wax also prevents excessive flaking when drawing with the crayon.

While the Petrowax 5530 Amber Micro Wax is preferred, other known acceptable substitutions include Paxwax 545 and Paxwax 633 microcrystalline waxes from Dussek Campbell. Substitutions for this wax are not as stringent as for the other two waxes.

Dibutyl Phthalate

The dibutyl phthalate acts as a plasticizer or solvent for the activator—namely, the zinc phenolic resin. The resin will not develop colors on the printed surface unless it is dissolved in dibutyl phthalate or some similar solvent. There is less latitude available for variations in the formulation here. Too much dibutyl phthalate will result in a too soft and greasy crayon. If too little dibutyl phthalate is used, the zinc phenolic resin will not fully dissolve, resulting in inferior image developing ability. The best ratio of dibutyl phthalate to HRJ-13023 resin is 1:1 by weight. If less dibutyl phthalate is used, then less phenolic resin should be used. Increasing both the dibutyl phthalate and zinc resin does not necessarily result in better developing ability.

Dibutyl phthalate is the best plasticizer/solvent found to date based on desired properties such as promoting good color development and miscibility with the wax components. Other plasticizers or solvents may be substituted provided they promote these desired properties. Possible substitutions include other phthalate esters such as dimethyl phthalate, diethyl phthalate and various alkyl benzyl phthalates. (Alkyl benzyl phthalate compounds are available under the trade names Santicizer 160 and Santicizer 261 from Monsanto Company, St. Louis, Mo.) Dodecanol or lauryl alcohol may also be used but it imparts a "chemical" smell to the crayon. Again, dibutyl phthalate performed the best overall.

Zinc Phenolic Resin

HRJ-13023 zinc phenolic resin is the activator in the wax that effects the color development on the paper. This is a waxy, oil soluble material that is fully miscible with the waxes and solvents used. It must be dissolved in a suitable plasticizer or solvent, such as dibutylphthalate, for it to work. Equal proportions of solvent and zinc phenolic resin seem to work best.

The HRJ-13023 Resin from Schenectady is preferred. HRJ-1365 may also be used, but it is a somewhat inferior resin in that it does not dissolve as readily in the dibutyl phthalate. Zinc salicylate may also be used in place of the zinc phenolic resin with somewhat inferior results. Since there is no known domestic commercial supplier of zinc salicylate, it must be synthesized in the lab. (Zinc salicylate synthesis: Mix equal volumes of 1 molar zinc sulfate and 2 molar sodium salicylate solutions at room temperature. Zinc salicylate will precipitate out. After crystallization is complete (about 15 minutes), filter the precipitate and dry in a low heat oven (60° C.) overnight. (Reference: Journal of the American Chemical Society, 70:2151.) If zinc salicylate is used, then 1-dodecanol should be used as the solvent in place of dibutyl phthalate. 1-dodecanol, or lauryl alcohol, is sold under the trade name Epal-12 from Albemarle Corp., Baton Rouge, La.

Color Developer Compositions

Preferred color developer compositions are set forth in Table 4, wherein all parts are by weight.

TABLE 4

COLOR DEVELOPER COMPOSITION INGREDIENTS

| INGREDIENTS | COMPOSITIONS 725-2 | 817-1 | 817-2 | 1003-2 | 324-2 |
|---|---|---|---|---|---|
| Dussek Campbell 4669 Paraffin wax | 50.5 | 47.7 | 56.2 | 43.5 | 23.8 |
| Dussek Campbell PH-100 Polyethylene wax | — | — | — | — | 23.8 |
| Hase 5530 Amber microcrystalline wax | 15.2 | 14.3 | 16.9 | 13.0 | 14.3 |
| Dibutyl phthalate (DBP) solvent | 10.1 | — | — | 26.1 | 19.0 |
| 1-Dodecanol (lauryl alcohol) solvent | 20.2 | 19.0 | 22.5 | — | — |
| Schenectady International | | | | | |
| HRJ-1365 Zinc phenolic resin | — | 19.0 | — | 17.4 | — |
| HRJ-13023 Zinc phenolic resin | — | — | — | — | 19.0 |
| Zinc salicylate | 4.0 | — | 4.4 | — | — |
| | 100.0 | 100.0 | 100.0 | 100.0 | 100.0 |

The 1-dodecanol, also known as lauryl alcohol, can be obtained under the trade name Epal 12 from Albemarle (formerly Ethyl Corp.). As the 1-dodecanol solvent has a distinct "chemical" smell, the compositions wherein the dodecanol is replaced by dibutyl phthalate as a solvent are preferred.

General Crayon Preparation Procedure

To form the color developer composition when dodecanol solvent is present, melt the dodecanol, if necessary. Melt the waxes together, separately from the solvent, preferably in a double boiler. Dissolve the zinc compound into the dodecanol, with heat if necessary. Add the dibutyl phthalate, when present, to the dodecanol solution and mix. Add the zinc solution to the melted wax mixture. Mix well and add to a suitable mold. Allow to cool before removing from the mold.

If no dodecanol is present, dissolve or melt the zinc compound into the dibutyl phthalate with heat. If using the HRJ-1365 resin, the mixture will thicken upon melting and, when ready, the mixture should be homogeneous with no lumps of the zinc compound material present. If using zinc salicylate or HRJ-13023 resin, the zinc compound should easily dissolve to form a thin soupy solution. The mixture thus formed is then added to the melted wax mixture, as described above. The latest wax formulation, 324-2, is the best to date and the one on which the detailed procedure which follows is based.

Crayon Preparation Procedure—Specific for Formulation 324-2

The three waxes were melted together in a glass beaker over low to moderate heat. The wax mixture was heated to around 220°–230° F. but not more than 260° F. When the waxes were fully melted, they were well mixed to obtain a uniform blend.

Separately, the dibutyl phthalate (DBP) and HRJ-13023 resin were heated together to about the same temperature as the waxes in a glass beaker. The mixture was stirred while heating until the resin fully melted and dissolved into the DBP. When the resin had fully dissolved, the solution turned from cloudy to clear. The solution was well mixed to assure a homogeneous blend. It was important to keep from overheating the sample since the phenolic resin can oxidize and turn brown if it is heated too long or at too high a temperature.

The DBP/resin solution was then added to the melted wax mixture while maintaining the heat. The blend was stirred until homogeneous. After it was well mixed, the molten wax was poured into suitable molds and allowed to cool at room temperature. When the mold had cooled sufficiently, preferably overnight, the crayons were removed from the mold.

Comments

Colorfastness of the developed images has been a continual problem with this application. While the crayon develops the colors well, the colors begin to fade noticeably within a week, especially the yellow. Most fading occurs when exposed to fluorescent lighting but can also occur to a slight extent under low light conditions when exposed to air. The colorfastness of the image is at least partially dependent on the wax crayon used since images developed with different waxes have varying degrees of lightfastness. For example, certain crayons develop images that are more lightfast than others. Crayon 324-2 is an improvement in feel and writing quality and overall is still best. The latest wax crayon has good lightfastness to about 5 days under average fluorescent lighting.

Developing Marker Ink Formulation

In addition to making a solid developer in the form of a crayon, a liquid developer in the form of a felt tip marker can also be made. Possible developing systems for markers seem more limited than for crayons since these should be water based. An oil based marker is probably possible but may not be an option for a children's application since it may be staining. Water based systems are limited to using activators that are water soluble since the developer has to be in solution for it to work.

One such formulation is:

| Parts by Weight | Component |
|---|---|
| 15 | zinc chloride |
| 5 | water |
| 5 | propylene glycol |
| 5 | isopropyl alcohol |

The ingredients were mixed together until the zinc chloride dissolved. The solution was then added to an empty absorbent cartridge of the type used in felt tip pens and made into a suitable marker.

COLOR FORMER COMPOSITIONS

Latent Image Ink—General Formulations

The color former composition is typically simply a white ink, with ordinary heat-set or oxidizing resins, ink oils and white pigment, to which was added the colorless or faintly colored dye pigment or color former. The color former or dye is first dissolved with heat in a suitable solvent. Then, after addition of the necessary UV absorbers, stabilizers and antioxidants, the color former composition is added to the white ink base.

The additives are recommended to preserve the developing ability of the color former and to prevent fading of the colors once developed. UV absorbers and UV stabilizers work synergistically and are both added to prevent degradation of the color former as a result of ultraviolet radiation. An antioxidant is also added to prevent or slow down oxidation of the color former from air or heat exposure. Preferred UV absorbers and stabilizers include those available under the trade names Tinuvin 1130, Tinuvin 292, Tinuvin 384 and Tinuvin 123 from Ciba-Geigy Corporation of Hawthorne, N.Y. Another preferred stabilizer is Sure-Sol 290 from Koch Chemical Company of Corpus Christi, Tex., although generally each color former manufacturer will have specific recommendations for the particular color formers sold. A preferred antioxidant is available under the trade name Irganox 1010 from Ciba-Geigy.

Preferred color former compositions are set forth in Table 5, wherein all parts are by weight. The color former may be Pergascript Blue I-2G (blue ink), Pergascript red I-6B (red ink), both available from Ciba Geigy Corp. of Greensboro, N.C., or Copikem 37 Yellow (yellow ink) or Copikem 4 N-102 Black (black ink), both available from Hilton Davis of Cincinnati, Ohio. The Peacock ink base supplied by Peacock Colors, Inc. of Butler, Wis. is made from 18 parts varnish, 24 parts opaque white, and 2 parts by weight anti-set gel. The Peacock ink base is similar to the offset heat-set scratch-off white ink available under the trade name C-28000 from INX International Ink Co. of Elk Grove Village, Ill.

Typically, the color former and the antioxidant are added, as powders, to the solvent, which is then heated gradually with stirring until both powders have completely dissolved. The mixture is then removed from the heat, and the various light absorbers and stabilizers added, with stirring until well mixed. Finally, the mixture is added to the ink base. The amount of solvent used may be decreased provided that the color former still dissolves and provides the required ink tack. The black color former is difficult or impossible to dissolve completely, but the other color formers will readily dissolve with heat.

The broad and medium ranges for the color former compositions are set forth in Table 5, as are the narrow ranges for preferred colors. All parts are by weight. The narrow range represents the best overall formula to date. The factors that make the best ink include the qualities for any press ink: printability, tack, color, stability, and reasonable cost. In addition to normal ink qualities, the printed image should be heat, air and light stable. It also must be sharp and quick and easy to develop with the marking crayon. The final developed image also should be lightfast and colorfast with little fading after a limited period of time. Note that the optimum invisible red ink formula is slightly different from the optimum invisible black, blue and yellow formulations.

The medium range formulations yield inks that are easily run on a press but may have inferior depth of color, lightfastness or printed image sharpness. The broad range formulation yields inks that have physical problems running on a press such as incorrect tack and viscosity in addition to inferior image sharpness, color density and color stability. Nevertheless this formula represents the minimum quality necessary to illustrate the invisible ink process.

TABLE 5

Color Former Composition Formulations

| Medium | Broad | Component |
|---|---|---|
| 35-55 | 25-75 | ink base |
| 0-7.5 | 0-10 | color former solvent |
| 0.5-5.0 | 0.1-10 | color former |
| 0.1-2.0 | 0-5 | antioxidant |
| 0.1-2.0 | 0-5 | U.V. light absorber |
| 0.1-2.0 | 0-5 | U.V. light stabilizer |
| **Narrow[1]** | **Narrow[2]** | **Component** |
| 83.3 | 80.5 | Peacock ink base |
| 9.3 | 8.5 | Koch Sure-Sol 290 color former solvent |
| 1.9 | 5.0 | Color former |
| 1.9 | 2.0 | Ciba Geigy Irganox 1010 antioxidant |
| 0.9 | 1.0 | Ciba Geigy Tinuvin 292 U.V. light absorber |
| 0.9 | 1.0 | Ciba Geigy Tinuvin 123 U.V. light absorber |
| 0.9 | 1.0 | Ciba Geigy Tinuvin 1130 U.V. light stabilizer |
| 0.9 | 1.0 | Ciba Geigy Tinuvin 384 U.V. light stabilizer |

[1]Invisible Blue, Black and Yellow Inks
[2]Invisible Red Ink

| Preferred Components | |
|---|---|
| Ink Base | Special Ink base blended by Peacock Colors, Inc., Butler, WI. The special ink base is a combination of approximately 18 parts varnish, 24 parts opaque white pigment dispersion and 2 parts anti-set gel (to prevent offsetting while printing). |
| Color Former Solvent | Sure Sol 290, (a butyl biphenyl hydrocarbon) Koch Chemical Co., Corpus Christi, TX |
| Color Former | |
| "Blue" Ink | Pergascript Blue I-2G, Ciba Geigy Corp., Chemicals Division, Greensboro, NC |
| "Red" Ink | Pergascript Red I-2R |
| "Yellow" Ink | Copikem 37 Yellow, Hilton Davis Company, Cincinnati, OH |
| "Black" Ink | Copikem 4 Black N-102 |
| Antioxidant | Irganox 1010, Ciba Geigy Corp., Additives Division, Hawthorne, NY |
| UV Absorbers/ | Tinuvin 292, 1130, 123 and 384, Ciba |

-continued

| Preferred Components | |
|---|---|
| Stabilizers | Geigy Corp., Additives Division, Hawthorne, NY |

Function of the Components and Possible Substitutions Ink Base

The ink base is the functional part of the ink containing the ink resins, vehicles, binders and some of the solvents necessary for it to transfer from the press' ink rollers to the paper. The ink must not only transfer well from press to paper but also have good color match with the paper. The final ink also must adhere well to the paper and to each of the other inks.

The Peacock ink base is preferred since Peacock Colors is the supplier of the finished invisible ink and is best able to control the production of the ink. Any suitable white ink base is acceptable, however, provided it blends well with the paper stock. The Peacock ink base is heavily loaded with white pigment. The ink color may have to be adjusted to match the brightness of the paper stock used. The ink preferably has a slightly "rough" finish with relatively "open" resin and binder system. This gives the ink better bite to grab onto the wax and allows the crayon developer to absorb into the ink quicker, resulting in faster and deeper color changes.

Color Former Solvent

The color former solvent is used to dissolve the color former dye before it is blended into the ink. The solvent must be stable and compatible with the ink base and color former. The Sure Sol 290 solvent is used specially as a color former solvent in carbonless paper applications.

Sure-Sol 290 is the preferred solvent. Other solvents specially made for dissolving copy dyes for carbonless paper may also be used. These include: KMC 113 (from Kreha Corp. of America), Meflex DA 029 (from ICI Chemicals, Wilmington, Del.) Santosol 340 (from Monsanto Corp., St. Louis, Mo.) and Sure Sol 330 (from Koch Chemical Co., Corpus Christi, Tex.).

The color former solvent is flashed off in the press' oven, and the fumes are vented to the atmosphere. In the future, environmental regulations may prohibit the use of ink made with this volatile solvent or prohibit a vendor from manufacturing it, in which case different color former solvents may be used—e.g., an ordinary ink oil solvent available under the trade name Magiesol 60 or Magiesol 52 from Magic Brothers in Franklin Park, Ill.

Color Former

The color former is the colorless dye that turns colored on contact with the developer. It must be relatively stable and fully compatible with the solvent and ink base. It also must show good reactivity with the developer and form stable images.

Antioxidant

An antioxidant is added to alleviate problems of air oxidation of the color former in the ink, both before and after color development. Without the antioxidant, undeveloped printed sheets exposed to air (or especially air and light) show very sluggish color development. After a period of time, the colors no longer develop at all. Also without an antioxidant, the developed colors fade with air and light exposure. The antioxidant slows down the degradation of the sensitive color formers and promotes longer shelf life of the printed pages.

Other antioxidants may be used provided they are fully functional and compatible with the other ink components. Irganox 1076 from Ciba Geigy, for example, may be substituted for the Irganox 1010.

U.V. Absorbers and Stabilizers

Similar to antioxidants, U.V. absorbers and stabilizers protect the color formers from degradations due to exposure to UV and visible light. Some long wave or low energy UV radiation is present in all light sources, especially the sun. UV absorbers and stabilizers act synergistically and therefore are usually used together. The absorber acts by absorbing UV radiation and converting it to harmless heat energy. The stabilizer acts as a second line of defense by scavenging harmful and highly reactive free radicals formed during exposure to light.

Without the absorbers and stabilizers the printed pages after several days of light exposure show sluggish development speed and developed pages show severe fading. The absorbers and stabilizers slow down the degradation of the color formers. Two different pairs of absorbers and stabilizers are preferably used since they work via different mechanisms and can back each other up. As with any form of aging, the antioxidants, UV stabilizers and UV absorbers can only lengthen the usable lifetime of the printed product. After enough light or air exposure, the printed forms will eventually fail.

Other UV stabilizers and absorbers may be used provided they are fully functional and compatible with the other ink components. The preferred absorbers and stabilizers are liquids so any replacements should also be liquids.

Color Former Composition Preparation Procedure

The color former powder and antioxidant powder were added to the color former solvent in a pyrex glass or stainless steel beaker or container. The mixture was heated slowly, with constant stirring over low heat, to about 200°–215° F. until both the color former and antioxidant had completely dissolved. The solution was removed from heat, the four stabilizers and absorbers were added, and the solution was mixed thoroughly.

Separately, the three components of the white ink base-the varnish, opaque white pigment dispersion and anti-set gel-were blended well together with a three roll mill. (A three roll mill is commonly used by ink manufacturers to blend ink components such as pigments, resins and waxes.)

Next the solution was blended well with the white ink base using the three roll mill. The ink was finally packaged in a suitable container and sealed. At this point the ink was ready for running on press. Each of the other colored inks were prepared in the same way.

IV. LATENT IMAGE PRINTING

Introduction

The latent image or color former composition inks can be printed on a web or sheet-fed press in which the inks are heat set or cured after passing through a high heat oven. (It is also possible to print such latent image inks as conventional oxidizing inks provided the required dryers are added to the inks.) Uncoated paper stock and a six-color Harris M-1000 web press were used.

In conventional web printing a continuous roll or web of paper of any acceptable width is fed through the press. (The M-1000 can accept paper widths up to about 32 inches.) The press has several printing units, each of which prints a different color ink. As the continuous web of paper is fed through the press, each color is applied in series at each printing unit. For example, in ordinary four-color process work, the black may be printed first, followed by blue, red and yellow. The ink is carried down the ink train and transferred from the ink rollers to the rotary printing plate which contains the image for that color. In offset printing the image on the plate is a true positive image. The ink on the plate is then transferred to the blanket or offset cylinder which is a reverse image. The blanket cylinder then transfers the image to the paper which now reads positive. After printing all the colors, the continuous form travels through a heated oven which heats the web as high as 325° F. to evaporate the ink oils and cure the ink on the paper. Then the web is cut and folded into unbound forms which are collected and pressure bound. All this occurs at a very high rate of speed to create thousands of printed unfinished booklets or forms per hour. (After printing, the forms can be trimmed and bound with covers into finished books.)

Flat, wet offset plates are normally used in offset printing. The plate is chemically treated to receive ink only on the image areas of the plate. To keep the ink from transferring to the non-image areas, a fountain solution (a special aqueous solution) is applied to the plate at the same time ink is applied. The fountain solution-coated areas of the plate repels the oil-based ink which transfers from the image part of the plate to the blanket and finally to the paper.

In this application, raised dry offset plates are used for the latent image inks. Dry offset plates need no fountain solution. The raised image on the relief plate carries the ink from the rollers to the blanket which in turn prints on the paper. In several press runs four latent color inks—black, blue, red and yellow-are run along with regular black process ink. The process black ink was used to print outlines of figures, titles and page numbers as in normal coloring books. The color change or latent image inks of course are used for printing the latent images. Relief plates were used for the latent color inks while a conventional flat, wet offset plate worked best for the regular black ink.

Just as in ordinary four color process work, the three primary latent image colors—red, blue and yellow—along with the latent black can be combined or printed over one another in such a pattern as to create virtually unlimited colors. In ordinary color printing the picture is really a pattern of microscopic ink dots of varying size and density. For example, the image may consist of a pattern of blue dots placed just between a pattern of yellow dots. The resulting image would appear green to the naked eye. In addition, the dot size or dot density of each of the four discrete colors can be varied to create even more colors and color tones. The same can be done with the latent image inks; the four latent image inks can be combined to create virtually unlimited colors when developed.

The ink printing order was found to be important: the regular process black was printed first followed by latent blue, latent red, latent yellow and last latent black. Reversing the order and printing the regular black last for some reason results in "dirty" invisible ink images on the paper.

Since the latent image ink has a dull or flat sheen, uncoated paper stock is best for this application. On coated stock, which has a slight glossy finish, the latent image ink can be seen as a dull image against the shiny background. This makes the "invisible" ink less than invisible. On uncoated paper these inks are much less visible. The uncoated paper used was 50 and 70 pound Weyerhauser Husky Smooth, and 50 pound Georgia Pacific Amherst Vellum.

The paper employed as support comprises not only normal paper made of cellulose fibers, but also paper in which the cellulose fibers are partially or completely replaced by fibers made from synthetic polymers.

Printing Procedure

After thoroughly cleaning the ink rollers and blankets well on the Harris M-1000 web press, each ink was loaded into the appropriate printing unit: The regular black went into the first unit, the latent blue ink went into the second unit, the latent red into the third, the latent yellow into the fourth and the latent black into the last unit. The roll of paper stock was also fed through the press and prepared for printing.

The press was started and the ink rollers were allowed to ink up before applying the ink to the plate cylinder. When ready, the press started applying ink to the paper. The paper web then fed through the ink-setting oven set at 275° F. and finally through the cutters and folders after which the forms were collected and bound. Only one side of the paper was printed.

The collected forms appeared blank except for the black ink figure outlines, titles and page numbers. The printed pages were checked throughout the run for correct "color" intensity and registration by developing the latent images with the developing crayon. If one color developed weak or out of register with the other colors, it was brought up in color or realigned respectively.

Several days after printing, the collected forms were run through a wire stitcher which stapled a cover, trimmed the edges and produced the finished book.

| Printing Eguipment and Components | | |
|---|---|---|
| Press | Harris M-1000 web press or equivalent capable of printing at least two colors and equipped with a suitable oven capable of curing heat set inks. | |
| Paper | Uncoated web paper stock such as Georgia Pacific Amherst Vellum or Weyerhauser Husky Smooth. Preferred paper basis weights range from 50 to 100 pounds. Other paper grades and weights may be substituted. | |
| Ink | Process Black Ink: | any heat-set process black ink; available from manufacturers such as Flint Ink, Sun Chemical Corp. and BASF. |
| | Invisible Ink: | heat-set type from Peacock Colors, Inc. |
| Press Plates | Process Black Ink: | wet offset plates with fountain solution |
| | Invisible Ink: | dry offset relief plates |

Possible Substitutions for Equipment and Components Press

While a web heat-set press is specified, it is possible that a sheet-fed press may be used in which the applied inks cure by ordinary air drying. A variety of less automated printing devices may also be employed.

Paper

Uncoated paper stock is preferred, but coated paper may be used with somewhat inferior results. Not only is there a difference in sheen between the flat ink and glossy paper, the crayon developer tends to smear the images printed on coated paper.

Board stock or very heavy paper stock may also be used provided the particular press can handle it.

Ink

Heat set inks must be used for web heat-set applications. Air oxidizing inks must be used for conventional sheet-fed applications.

Ink Plates

While a flat, wet offset plate is best for the process black ink, a dry relief plate may be substituted. Dry relief plates are recommended for the invisible inks but flat, wet offset plates may be used provided there are no detrimental interactions between the fountain solution and the invisible inks.

Referring now to the drawing, therein illustrated is a child playing with the latent image development system of the present invention, generally designated by the reference numeral 10. The system 10 includes a substrate 12 which has been pre-printed with both visible images 14 and latent or invisible images 16. Some of the latent images 16 have already been developed by the child applying a crayon-like developer dispenser 20 in areas originally having a latent image, and now having a multicolored image 18 (illustrating ground, trees, a small house, etc.). It will be appreciated that the various elements of the drawing are shaded for contrasting color, except for the latent image 16 which appears to be white within the borders thereof. The multicolor image developed by use of the developer dispenser 20 is enhanced by the always visible image 14 suggesting little sheep about the now visible tree and house. In this instance, the child will be intrigued by the presence of the sheep on the substrate 12 (otherwise blank except for image outlines) and will hopefully have his curiosity aroused sufficiently for him to complete the drawing to see what the sheep relate to.

Conclusion

A critical feature of the present invention is that the colorless or faintly colored latent multicolor image on the substrate is formed by a plurality of different color former compositions such that the image that is later developed on the substrate is multicolored. Color formers of the type described herein are available in such colors as black, blue, red, yellow, orange and green. As will be appreciated by those in the printing industry, it is only necessary to have three different color formers providing the primary colors to enable the production of any color of the spectrum desired, with the three colors being mixed in the appropriate proportions to achieve the desired color.

The substrate may be printed only with color former compositions so that the entire multicolor image developed on the page goes from latent to visible. On the other hand, the page may also have thereon an additional unicolor or multicolor image (e.g., associated text or pictorial matter) which is conceptually related to, or intended to complement, the developed latent image. Preferably the substrate is printed with both the aforementioned color former compositions and a visible color image which will cooperate with the latent multicolor image to be later developed by the dispenser composition to form a visible multicolor image.

To summarize, the present invention provides a latent image development system for producing a multicolor image on a substrate, wherein the color former composition defines the latent image on the substrate and-the color developer composition is applied to the latent image on the substrate from a dispenser. The system is economical to use as the excess application of the composition from the dispenser results in excess application of the cheaper composition. The system provides greater play value to a game because of the multicolor nature of the developed image.

Now that the preferred embodiments of the present invention have been shown and described in detail, various modifications and improvements thereon will readily become apparent to those skilled in the art. Accordingly, the spirit and scope of the present invention is to be construed broadly and limited only by the appended claims, and not by the foregoing specification.

We claim:

1. A latent image development system for producing a multicolor image on a substrate, comprising in combination:

(A) a substrate having a colorless or faintly colored latent multicolor image thereon, said latent image being formed by a plurality of different color former compositions, each including a Lewis base color former; and (B) a dispenser adapted to development of said latent multicolor image on said substrate by marking thereover and reacting with a single color developer composition, said color developer composition being free of inorganic metallic salts and including a Lewis acid color developer operative for each of said color former compositions.

2. The system of claim 1 wherein said substrate is paper printed with said color former compositions.

3. The system of claim 1 wherein said substrate is printed with both said color former compositions and a visible color image which will cooperate with the latent multicolor image later developed by said dispenser to form a visible multicolor image.

4. The system of claim 1 wherein said color former changes hybridization from $sp^3$ to $sp^2$ in going from a colorless non-planar geometry to a colored planar geometry.

5. The system of claim 1 wherein said color former is selected from the group consisting of crystal violet lactone, Michler's hydrol, fluoran, leuco and auramine compounds, bis-indolylphthalide compounds and combinations thereof.

6. The system of claim 1 wherein said dispenser is in solid form.

7. The system of claim 1 wherein said dispenser is a felt tip pen or a liquid paint.

8. The system of claim 7 wherein said dispenser contains a plurality of different types of wax compositions and a solvent for said color developer composition.

9. The system of claim 8 wherein said color developer is a zinc salt of a phenolic compound.

10. The system of claim 9 wherein said color developer is a phenolic hydroxy group-containing compound.

11. The system of claim 10 wherein said color developer is a zinc modified phenolic resin compound.

12. A latent image development system for producing a multicolor image on a substrate, comprising:

a substrate having a colorless or faintly colored latent multicolor image thereon, said latent image being formed by a plurality of different color former compositions, each including a Lewis base color former, and said latent image being adapted to development of said latent multicolor image on said substrate by marking thereover and reacting with a single color developer composition, the color developer composition being free of inorganic metallic salts and including a Lewis acid color developer operative for each of said color former compositions.

13. The system of claim 12 wherein said substrate is paper printed with said color former compositions.

14. The system of claim 12 wherein said substrate is printed with both said color former compositions and a visible color image which will cooperate with the latent multicolor image later developed to form a visible multicolor image.

15. The system of claim 12 wherein said color former changes hybridization from $sp^3$ to $sp^2$ in going from a colorless non-planar geometry to a colored planar geometry.

16. The system of claim 12 wherein said color former is selected from the group consisting of crystal violet lactone, Michler's hydrol, fluoran, leuco and auramine compounds, bis-indolylphthalide compounds and combinations thereof.

17. A latent image development system for producing a multicolor image on a substrate having a colorless or faintly colored latent multicolor image thereon, the latent image being formed by a plurality of different color former compositions, each including a Lewis base color former, comprising:

a dispenser adapted to development of a latent multicolor image on a substrate by marking thereover and reacting with a single color developer composition, said color developer composition being free of inorganic metallic salts and including a Lewis acid color developer operative for each color former composition.

18. The system of claim 17 wherein said dispenser is in solid form.

19. The system of claim 17 wherein said dispenser is a felt tip pen or a liquid paint.

20. The system of claim 18 wherein said dispenser contains a plurality of different types of wax compositions and a solvent for said color developer composition.

21. The system of claim 20 wherein said color developer is a zinc salt of a phenolic compound.

22. The system of claim 21 wherein said color developer is a phenolic hydroxy group-containing compound.

23. The system of claim 22 wherein said color developer is a zinc modified phenolic resin compound.

24. A latent image development system for producing a multicolor image on a substrate, comprising in combination:

(A) a paper substrate having a colorless or faintly colored latent multicolor image printed thereon, said latent image being formed by a plurality of different color former compositions, each including a Lewis base color former; and (B) a dispenser in solid form adapted to development of said latent multicolor image on said substrate by marking thereover and reacting with a single color developer composition, said color developer composition being free of inorganic metallic salts and including a Lewis acid color developer operative for each of said color former compositions, said dispenser containing a plurality of different types of wax compositions and a solvent for said color developer composition, said color developer being a zinc salt of a phenolic hydroxy group-containing compound.

25. The system of claim 24 wherein said substrate is printed with both said color former compositions and a visible color image which will cooperate with the latent multicolor image later developed by said dispenser to form a visible multicolor image.

26. The system of claim 24 wherein said color former changes hybridization from $sp^3$ to $sp^2$ in going from a colorless non-planar geometry to a colored planar geometry.

27. The system of claim 24 wherein said color former is selected from the group consisting of crystal violet lactone, Michler's hydrol, fluoran, leuco and auramine compounds, bis-indolylphthalide compounds and combinations thereof.

* * * * *